United States Patent [19]

Mandelik et al.

[11] Patent Number: 4,568,530

[45] Date of Patent: Feb. 4, 1986

[54] AMMONIA SYNTHESIS

[75] Inventors: Bernard G. Mandelik; John R. Cassata, both of Houston; Philip J. Shires, Katy; Christiaan P. van Dijk, Houston, all of Tex.

[73] Assignee: The M. W. Kellogg Company, Houston, Tex.

[21] Appl. No.: 661,525

[22] Filed: Oct. 16, 1984

[51] Int. Cl.[4] .............................................. C01C 15/00
[52] U.S. Cl. .................................... 423/359; 423/361; 423/362
[58] Field of Search ................. 423/359, 360, 361, 362

[56] References Cited

U.S. PATENT DOCUMENTS

| | | | |
|---|---|---|---|
| 3,002,816 | 10/1961 | Friend et al. | 23/199 |
| 3,721,532 | 3/1973 | Wright et al. | 23/289 |
| 4,180,543 | 12/1979 | Ward | 422/148 |
| 4,213,954 | 7/1980 | Pinto | 423/359 |
| 4,215,099 | 7/1980 | Pinto et al. | 423/360 |
| 4,230,680 | 10/1980 | Becker et al. | 423/360 |
| 4,242,317 | 12/1980 | Pinto | 423/359 |
| 4,250,057 | 2/1981 | Foster et al. | 252/447 |
| 4,271,136 | 6/1981 | Tennison | 423/362 |
| 4,298,588 | 11/1981 | Pinto | 423/359 |
| 4,383,982 | 5/1983 | Pinto | 423/359 |

Primary Examiner—John Doll
Assistant Examiner—Wayne A. Langel

[57] ABSTRACT

A process for production of ammonia wherein stoichiometrically hydrogen-lean synthesis gas is reacted over a highly active synthesis catalyst.

5 Claims, 1 Drawing Figure

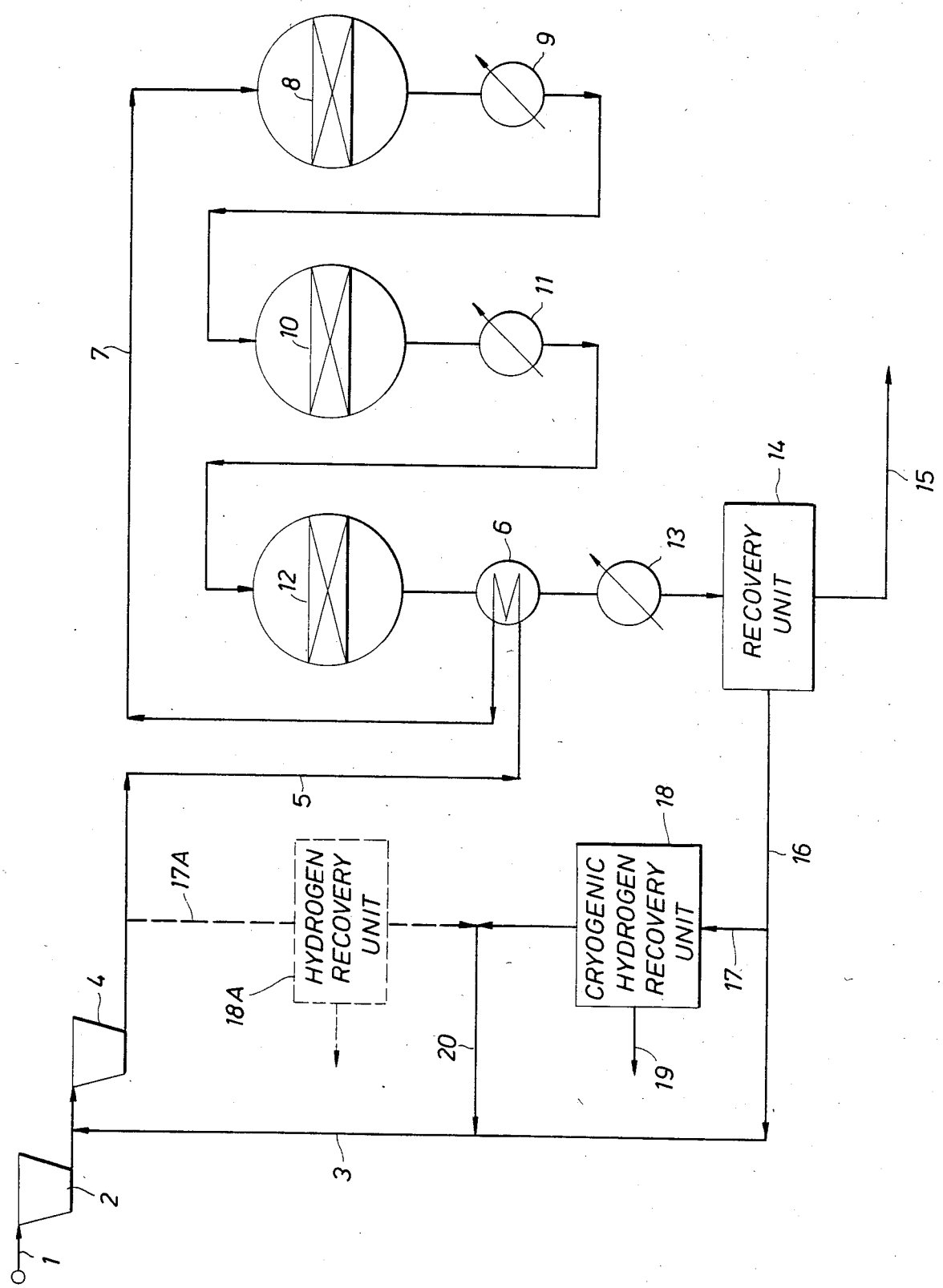

AMMONIA SYNTHESIS

This invention relates to a process for catalytic synthesis of ammonia from hydrogen and nitrogen in a synthesis loop wherein fresh synthesis gas is combined with recycle gas to form combined synthesis gas which is partially reacted to ammonia in a conversion system.

Most commercial production of ammonia is based on use of the large, single-train plant design introduced in the 1960–1970 decade which employs the sequential process steps of primary endothermic steam reforming, secondary exothermic steam reforming with air, shift conversion of carbon monoxide to hydrogen and carbon dioxide, carbon dioxide removal, and residual carbon oxides conversion to produce fresh synthesis gas in close to the stoichiometric hydrogen to nitrogen molar ratio (sometimes hereinafter referred to as H/N ratio) of three moles hydrogen and one mole nitrogen plus much smaller amounts of undesirable inert gases including residual methane and argon. In these single-train designs, the fresh synthesis gas is centrifugally compressed to synthesis pressures typically between 100 and 220 kg/cm$^2$ and combined in a synthesis loop with centrifugally compressed recycle gas from an ammonia conversion system. These compressors as well as others are driven by high pressure steam turbines or their electric motor equivalents and derive their power from waste heat recovered principally from the feedstock reforming and ammonia synthesis process steps. The conversion system is typically a single, high pressure, high temperature reactor having several beds of predominantly iron catalyst and heat exchangers or quench gas devices for removing exothermic heat of synthesis. Ammonia is condensed out of the synthesis loop typically by heat exchange with water and then with mechanical refrigeration.

Basic design of these plants has changed little but significant energy improvements have been made through efficiency improvements in various process steps, for example carbon dioxide removal, as well as by more extensive process heat recovery and improved equipment designs. Regrettably, most of these energy improvements have been attained at the penalty of higher equipment cost brought about, for example, by more complex ammonia converters, reforming furnaces with more extensive waste heat recovery, and increased surface area in heat exchangers.

Fundamental change has been stymied to large extent by the fact that energy supply and recovery from the reforming section of an ammonia plant must be balanced by energy consumption of compressor drives in the plant. A possible reduction iw size, cost, and fuel consumption of the primary reforming furnace (by techniques later described) with corresponding reduction in waste heat recovery in the form of high pressure steam or its electrical equivalent is of little value if energy must then be imported to satisfy synthesis loop compression requirements. It is therefore desirable to effect savings in synthesis loop power use to balance the potential economies in the reforming section in order to realize overall reductions in the capital cost of the plant as well as the energy cost per unit of ammonia produced.

Such savings are difficult to obtain in the face of often competing technical and economic considerations. For example, ammonia formation is favored by high pressure which adversely affects compressor power requirements; ammonia formation is favored by low temperature from an equilibrium viewpoint but high temperature from a kinetic viewpoint; ammonia formation is favored by low ammmonia concentrations in the synthesis gas but low concentrations require a more rigorous ammonia recovery scheme and high recycle flow; a smaller primary reforming furnace may be employed with more secondary reforming to produce synthesis gas containing a stoichiometric excess of nitrogen, but if the excess is not removed, an increment of unreacted nitrogen having adverse effects must be circulated in the synthesis loop. The foregoing is exemplary, but not exhaustive, of the technical and economic complexities found by an ammonia plant designer.

It is known to shift a portion of the reforming duty from the primary reforming furnace to the secondary reformer through use of excess air and more fuel in the secondary reformer. This shift of duty results, however, in fresh synthesis gas having a nitrogen content in excess of stoichiometric requirements. Therefore, a large capacity nitrogen rejection unit must be included somewhere in the process scheme. Regrettably the cost of such unit substantially nullifies the economy effected in the reforming step. We have found, however, that an excess-nitrogen, fresh synthesis gas may be combined with recycle gas having an even greater nitrogen excess to form combined synthesis gas which, when reacted over a highly active catalyst, permits conversion system inlet and outlet ammonia concentration at near traditional levels. We accomplish this primarily by rejecting excess nitrogen from a customarily small purge gas stream taken from the synthesis loop and by reducing the flow rate of recycle gas to the conversion system.

According to the invention, ammonia is produced in a synthesis loop by catalytically converting stoichiometrically hydrogen-lean combined synthesis gas comprised of fresh synthesis gas and hydrogen-enriched recycle gas over a synthesis catalyst wherein the hydrogen to nitrogen molar ratio of the fresh synthesis gas is greater than that of the hydrogen-enriched recycle gas and the volumetric flow rate of the hydrogen-enriched recycle gas is between 2.2 and 3.7 times the volumetric flow rate of the fresh synthesis gas.

The synthesis loop broadly comprises an ammonia conversion system having one or more catalytic reactors and means for removal of synthesis reaction heat, a liquid ammonia recovery system, a purge gas system including a hydrogen recovery unit, and a compression system for circulating gas in the synthesis loop and introducing fresh synthesis gas to the loop.

The combined synthesis gas has an H/N ratio between 0.8 and 1.8 and is introduced to a highly active synthesis catalyst, preferably a platinum group metal supported on graphite-containing carbon, in a conversion system at a temperature between 315° C. and 400° C. and pressure between 50 kg/cm$^2$ and 150 kg/cm$^2$ where it is partially reacted to provide a converted gas having an ammonia concentration between 8 and 18 volume percent, preferably between 10 and 15 volume percent.

The conversion system is tailored to the unique characteristics of the synthesis loop conditions as well as to the highly active catalyst and comprises a plurality of adiabatic catalyst beds in series with interbed cooling wherein the exit temperatures of gas from each of the beds is between 335° C. and 435° C. and the catalyst space velocities are generally between 5000 and 150,000 m$^3$ per hour of gas per m$^3$ of catalyst at standard conditions. A preferred, highly active synthesis catalyst is ruthenium supported on graphite-containing carbon more fully described in U.S. Pat. No. 4,250,057. Other highly active catalysts such as other platinum group metals may be employed provided that their activity is greater than 150, preferably greater than 300, kg-moles of ammonia per hour per $m^3$ of catalyst at 70 bar and 400° C. using synthesis gas having an H/N ratio of 1.

Temperature conditions in the conversion system are lower than those customarily employed with traditional iron catalyst and result in sufficient conversion to attain the target ammonia concentration in converted gas while, at the same time, limiting the exothermic temperature rise to a point low enough to prevent catalyst damage but high enough to recover useful waste heat by indirect heat exchange between partially converted synthesis gas and a heat recovery fluid.

Preferably, the conversion system will employ three adiabatic catalyst beds with cooling between the beds by indirect heat exchange with boiler feed water to raise steam. In this preferred embodiment, combined synthesis gas having a hydrogen to nitrogen ratio between 0.9 and 1.5 is introduced to the first catalyst bed at a temperature between 350° C. and 380° C., a pressure between 70 and 85 $kg/cm^2$ and partially reacted to an ammonia concentration between 5 and 8 volume percent. The partially reacted gas from the first bed is then cooled to between 340° C. and 375° C. and further reacted in the second bed to an ammonia concentration between 8 and 12 volume percent. Further reacted gas from the second bed is cooled to between 335° C. and 365° C. and lastly reacted in the third bed at temperatures within the temperature range from 325° C. to 405° C. to an ammonia concentration between 12 and 18 volume percent. In a most preferred embodiment, the mass flow of gas through the first catalyst bed is substantially equal to that of the last catalyst bed. That is to say, the partially reacted synthesis gas is not significantly cooled by introduction of quenching gas except for optional addition of small amounts of gas which may be used for fine temperature control within the conversion system.

Combined synthesis gas entering the conversion system will contain from 35 to 50 volume percent hydrogen, from 25 to 55 volume percent nitrogen, from 1 to 5 volume percent ammonia, and usually from 2 to 25 volume percent methane plus argon in addition to trace amounts of other inert gases. Converted gas leaving the conversion system will contain from 20 to 40 volume percent hydrogen, from 25 to 60 volume percent nitrogen, and from 10 to 18 volume percent ammonia in addition to the inert gases. For present purposes, nitrogen is not viewed as an inert gas notwithstanding its presence in stoichiometric excess for ammonia synthesis.

Ammonia may be recovered from the synthesis loop directly upstream of the conversion system but is preferably recovered directly downstream of the conversion system to maximize ammonia recovery. Water wash or other ammonia recovery systems may be employed but we prefer to use mechanical refrigeration systems with ammonia refrigerant at several pressure levels.

In conventional practice, a purge stream is removed from the synthesis loop to dispose of inert gases which would otherwise accumulate in the loop. Since the purge stream contains hydrogen, nitrogen, and ammonia in addition to inert gases methane and argon, it is known to recover a hydrogen-rich stream from the purge gas by use of a cryogenic or membrane separation process step and return the hydrogen-rich stream to the recycle gas. In these instances, the recycle gas then contains a stoichiometric exces of hydrogen which is favorably offset by adjustment of the fresh synthesis gas to contain a slight stoichiometric deficiency of hydrogen. Ammonia synthesis gas resulting from combination of these streams then contains hydrogen and nitrogen in substantially stoichiometric ratio. Since this technique results in only modest savings in feed/fuel requirements to the reforming section, it has been proposed to sharply reduce the H/N ratio of fresh synthesis gas while, at the same time, reducing the H/N ratio of synthesis gas to the conversion system. Since, however, the H/N ratio of the fresh gas is lower than that of synthesis gas to the conversion system, it becomes necessary to remove a very large purge stream from the synthesis loop, reject a large amount of nitrogen from that purge stream, and return a very large hydrogen-rich gas stream to the recycle stream so that the recycle stream will then have a higher H/N ratio than the fresh synthesis gas. This procedure requires a large hydrogen recovery unit to enrich the recycle gas as well as a customarily high flow rate of recycle gas with respect to fresh synthesis gas.

In the process of the present invention, the purge stream is relatively small in comparison with the recycle gas flow and is treated in a relatively small hydrogen recovery unit. The amount of purge gas removed is dependent on the type of hydrogen recovery unit employed but will be sufficient to maintain an argon plus methane concentration in converted gas at the conversion system outlet between 2 and 30 volume percent, preferably between 6 and 10 volume percent, and to maintain an H/N ratio in the hydrogen-enriched recycle gas between 0.5 and 1.7. We use a fresh synthesis gas having an H/N ratio between 1.7 and 2.5 and combine it with the hydrogen-enriched recycle gas at a volumetric ratio of between 2.2 and 3.7 parts recycle gas to one part fresh synthesis gas to form the previously discussed combined synthesis gas at an H/N ratio between 0.8 and 1.8. By maintaining the H/N ratio of recycle gas below that of the fresh gas and using a relatively low recycle gas flow rate, we save recycle gas compression power and, hence, reduce the power generation requirements from waste heat in the reforming section of the plant. The amount of waste heat produced in the reforming section is correspondingly reduced by virtue of lower primary reforming requirements in production of fresh synthesis gas having an H/N ratio between 1.7 and 2.5 and the capital costs as well as the overall feed and fuel requirement of the process are thereby significantly reduced.

In the preferred embodiment wherein we employ combined synthesis gas in the conversion system having a hydrogen to nitrogen molar ratio between 0.9 and 1.5, we prefer to use a fresh synthesis gas having an H/N ratio between 1.9 and 2.4 and combine the hydrogen-enriched recycle gas with fresh synthesis gas at a volumetric flow rate ratio between 2.4 and 3.5. In a most preferred embodiment, we remove the purge stream from the synthesis loop in an amount equivalent to between 4 to 12 volume percent of the combined synthesis gas and return a hydrogen-rich gas containing between 70 and 95 volume percent hydrogen to the synthesis loop to form the hydrogen-rich recycle gas that is subsequently combined with the fresh synthesis gas.

The fresh synthesis gas may be produced by any means including partial oxidation of solid or liquid fuels but is typically produced by known methods for steam reforming hydrocarbons, preferably natural gas. The reforming process is selected and designed to economically produce raw gas which can be shifted and treated for removal of carbon oxides by conventional methods to produce fresh synthesis gas having the previously recited H/N ratio. Preferred reforming processes are those having distinct endothermic (primary) and exothermic (secondary) steam reforming steps wherein primary reforming duty is minimized with respect to secondary duty by use of excess high temperature air in the secondary reformer. This shift in duty permits us to either reduce the size and fuel consumption of the primary steam reforming furnace or to delete the furnace entirely and provide heat for the primary reforming in a reactor-exchanger from hot outlet gases of the exothermic, secondary reformer as more fully described in our co-pending U.S. patent application Ser. No. 417,718.

Referring now to the drawing, 5663 kg-moles per hour of fresh synthesis gas at 35° C. and 35 kg/cm$^2$ having a composition by volume of 65% $H_2$, 32.5% $N_2$, 1.9% $CH_4$, 0.4% Ar, and 0.2% water is introduced via line 1 to make-up gas compressor 2, compressed to 75 kg/cm$^2$, separated from condensed moisture, and mixed with 19078 kg-moles per hour of hydrogen enriched recycle gas from line 3 having a hydrogen to nitrogen molar ratio of 0.8. The resulting combined synthesis gas having a composition by volume of 45% $H_2$, 45% $N_2$, 2.5% $NH_3$, 6.2% $CH_4$, and 1.3% Ar is then compressed to 80 kg/cm$^2$ in recycle compressor 4 and directed via line 5 to feed/effluent exchanger 6 where the combined synthesis gas is preheated to 355° C. for introduction via line 7 to the ammonia conversion system.

The conversion system comprises three adiabatic catalyst beds 8, 10, 12 arranged in series flow and provided with interbed coolers 9 and 11. Each catalyst bed is disposed for axially downward flow in a hot wall, spherical reactor and contains a layer of promoted ruthenium catalyst on a graphite-containing carbon support.

The combined synthesis gas is partially converted in first catalyst bed 8 to an increased ammonia content of 7.2 volume percent at an outlet temperature of 430° C. and then cooled to 355° C. by indirect heat exchange with boiler feed water to produce steam. Cooled, partially converted synthesis gas is then introduced to second catalyst bed 10 and further converted to an ammonia concentration of 11 volume percent at an outlet temperature of 410° C. and then cooled to 350° C. by indirect heat exchange with boiler feed water to produce steam. The further converted synthesis gas is then introduced to the third and final catalyst bed 12 where the ammonia concentration is increased to 13.5 volume percent at an outlet temperature of 385° C. The converted gas from the third catalyst bed has a composition by volume of 33.8% $H_2$, 44.5% $N_2$, 13.5% $NH_3$, 6.8% $CH_4$, and 1.5% Ar and is cooled in feed/effluent exchanger 6 and cold water exchanger 13 to a temperature of 40° C. prior to introduction of the converted gas to refrigerative ammonia recovery system 14.

The ammonia recovery system is conventional and operates at several temperature levels for optimum use of available cooling resulting from pressure let-down of recovered ammonia. In recovery system 14, 2441 kg-moles per hour of liquid ammonia is separated from the converted gas at a final temperature of $-33°$ C. and recovered as product via line 15. The balance of the converted gas is removed via line 16 as recycle gas.

A purge stream 17 constituting 7 volume percent of the recycle gas in line 16 is diverted to a cryogenic hydrogen recovery unit 18 where sufficient inert gases are purged from the synthesis loop via line 19 to maintain an argon plus methane concentration in the converted gas of 8.3 volume percent. Alternatively, the purge stream may be taken from the combined synthesis gas via line 17A to hydrogen recovery unit 18A to maintain the same level of inert gases in the synthesis loop. In hydrogen recovery unit 18, 88 volume percent of the hydrogen entering the unit is recovered and 559 kg-moles per hour hydrogen-rich gas containing 85 volume percent hydrogen is removed through line 20 and mixed with the balance of recycle gas to form the hydrogen enriched recycle gas in line 3.

We claim:

1. In a process for producing ammonia in a synthesis loop wherein fresh synthesis gas containing hydrogen, nitrogen and, lesser amounts of argon and methane is combined with a hydrogen enriched recycle gas to provide combined synthesis gas, the combined synthesis is introduced to and reacted over ammonia synthesis catalyst under synthesis conditions to provide converted gas containing ammonia, hydrogen, and nitrogen, ammonia is recovered from the converted gas to provide recycle gas, a purge stream is removed from the synthesis loop, a hydrogen-rich gas is recovered from the purge stream, and the hydrogen-rich gas is combined with the recycle gas to provide the hydrogen enriched recycle gas, the improvement which comprises:

(a) providing the fresh synthesis gas at a hydrogen to nitrogen molar ratio between 1.7 and 2.5 and providing the hydrogen enriched recycle gas at a hydrogen to nitrogen molar ratio between 0.5 and 1.7 to thereby provide the combined synthesis gas at a hydrogen to nitrogen molar ratio between 0.8 and 1.8 wherein the volumetric flow rate ratio of the hydrogen enriched recycle gas to the fresh synthesis gas is between 2.2 and 3.7; and (b) introducing the combined synthesis gas from step (a) to an ammonia synthesis catalyst at a temperature between 315° C. and 400° C. and a pressure between 50 kg/cm$^2$ and 150 kg/cm$^2$.

2. The process of claim 1 wherein the fresh synthesis gas is provided at a hydrogen to nitrogen molar ratio between 1.9 and 2.4 to thereby provide the combined synthesis gas at a hydrogen to nitrogen molar ratio between 0.9 and 1.5 wherein the volumetric flow ratio of the hydrogen enriched recycle gas to fresh synthesis gas is between 2.4 and 3.5.

3. The process of either claim 1 or claim 2 wherein the purge stream is removed from the synthesis loop in an amount between 4 and 12 volume percent of the combined synthesis gas and the hydrogen-rich gas contains between 70 and 95 volume percent hydrogen.

4. The process of either claim 1 or claim 2 wherein the ammonia synthesis catalyst comprises a platinum group metal supported on graphite-containing carbon.

5. The process of either claim 1 or claim 2 wherein the purge stream is removed from the synthesis loop in sufficient amount to maintain a concentration of argon plus methane in the converted gas between 6 and 10 volume percent.

* * * * *